United States Patent
O'Brien

(10) Patent No.: US 7,769,731 B2
(45) Date of Patent: Aug. 3, 2010

(54) USING FILE BACKUP SOFTWARE TO GENERATE AN ALERT WHEN A FILE MODIFICATION POLICY IS VIOLATED

(75) Inventor: Thomas Edward O'Brien, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 192 days.

(21) Appl. No.: 11/538,684

(22) Filed: Oct. 4, 2006

(65) Prior Publication Data

US 2008/0086513 A1 Apr. 10, 2008

(51) Int. Cl.
G06F 17/00 (2006.01)

(52) U.S. Cl. .............. 707/694; 726/1; 726/2; 726/3; 726/4; 726/26; 726/27

(58) Field of Classification Search ........... 707/200, 707/694; 726/208, 1–4, 37–27
See application file for complete search history.

(56) References Cited

U.S. PATENT DOCUMENTS

| | | | |
|---|---|---|---|
| 4,961,224 A | 10/1990 | Yung | |
| 6,460,055 B1 * | 10/2002 | Midgley et al. | 707/204 |
| 6,460,141 B1 | 10/2002 | Olden | |
| 6,925,467 B2 * | 8/2005 | Gu et al. | 707/101 |
| 6,971,018 B1 * | 11/2005 | Witt et al. | 713/187 |
| 6,996,844 B2 | 2/2006 | Langford et al. | |
| 7,152,242 B2 * | 12/2006 | Douglas | 726/23 |
| 7,437,763 B2 * | 10/2008 | Guo | 726/25 |
| 7,546,353 B2 * | 6/2009 | Hesselink et al. | 709/216 |
| 2002/0010702 A1 * | 1/2002 | Ajtai et al. | 707/101 |
| 2003/0046287 A1 * | 3/2003 | Joe | 707/10 |
| 2004/0049693 A1 * | 3/2004 | Douglas | 713/200 |
| 2004/0199647 A1 | 10/2004 | Ramarao et al. | |
| 2005/0144195 A1 * | 6/2005 | Hesselink et al. | 707/201 |
| 2005/0183143 A1 | 8/2005 | Anderholm et al. | |
| 2005/0216781 A1 | 9/2005 | Doshi et al. | |
| 2006/0064416 A1 * | 3/2006 | Sim-Tang | 707/6 |

* cited by examiner

Primary Examiner—Tim T. Vo
Assistant Examiner—Gary Koo
(74) Attorney, Agent, or Firm—Yee & Associates, P.C.; Jeffrey S. LaBaw

(57) ABSTRACT

A method and data processing system for using file backup software to generate an alert when a file modification policy is violated. File backup software is installed on a computer to monitor a plurality of files. If the file backup software detects a modification to a file, the file backup software determines whether a file modification policy associated with the file has been violated. If the file backup software determines that the file modification policy has been violated, the file backup software generates an alert, indicating that the modification violates the modification policy.

10 Claims, 3 Drawing Sheets

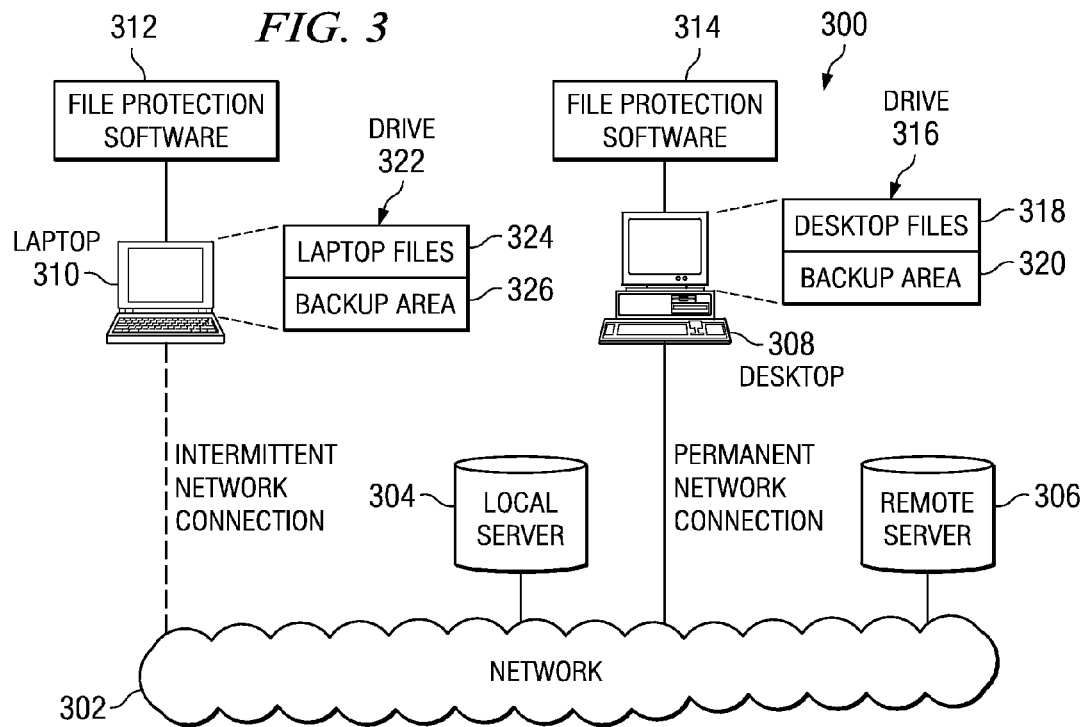
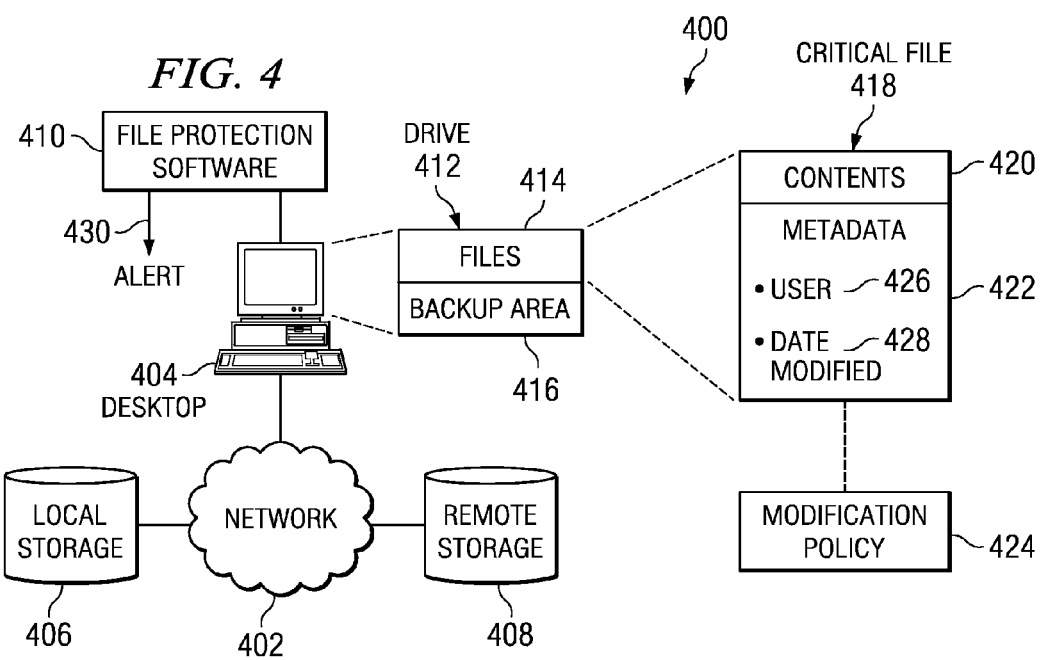

USING FILE BACKUP SOFTWARE TO GENERATE AN ALERT WHEN A FILE MODIFICATION POLICY IS VIOLATED

BACKGROUND OF THE INVENTION

1. Field of the Invention

The present invention relates generally to data processing systems and in particular to file backup software. Still more particularly, the present invention relates to a method, apparatus, and computer usable program code for using file backup software to generate an alert when a file modification policy is violated.

2. Description of the Related Art

Typically, most of a company's critical information is stored in files in the company's data processing system. A company typically deploys software to frequently backup the company's critical files. Backups are performed at regular intervals, such as daily or weekly, so that files can be restored in the event critical files are deleted or corrupted.

However, frequent backups do not protect against a user, intentionally or accidentally, deleting or modifying one or more critical files. Typically, most users of the company's data processing system have access to the company's files. Most users can therefore modify files even if they are not specifically authorized to modify the files. Most users can also modify the files many months, or even years, after the files were last modified.

SUMMARY OF THE INVENTION

The different embodiments provide a method and data processing system for using file backup software to generate an alert when a file modification policy is violated. File backup software is installed on a computer to monitor a plurality of files. If the file backup software detects a modification to a file, the file backup software determines whether a file modification policy associated with the file has been violated. If the file backup software determines that the file modification policy has been violated, the file backup software generates an alert, indicating that the modification violates the modification policy.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 3 depicts a block diagram of a data processing network with file protection software in which different embodiments may be implemented;

FIG. 4 is a block diagram depicting file protection software on a data processing network.

DETAILED DESCRIPTION OF THE PREFERRED EMBODIMENT

Figure 1:
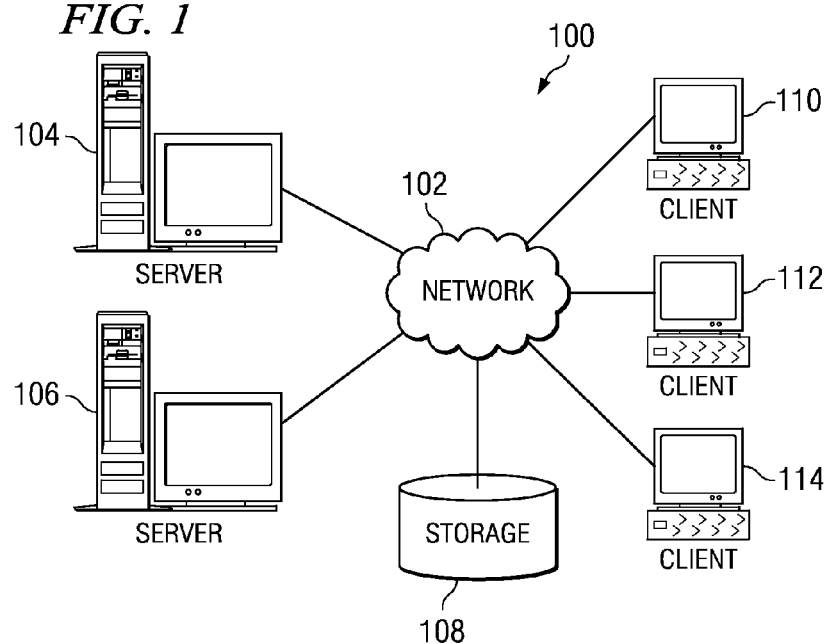
FIG. 1 depicts a pictorial representation of a network of data processing systems in which illustrative embodiments may be implemented.
Figure 2:
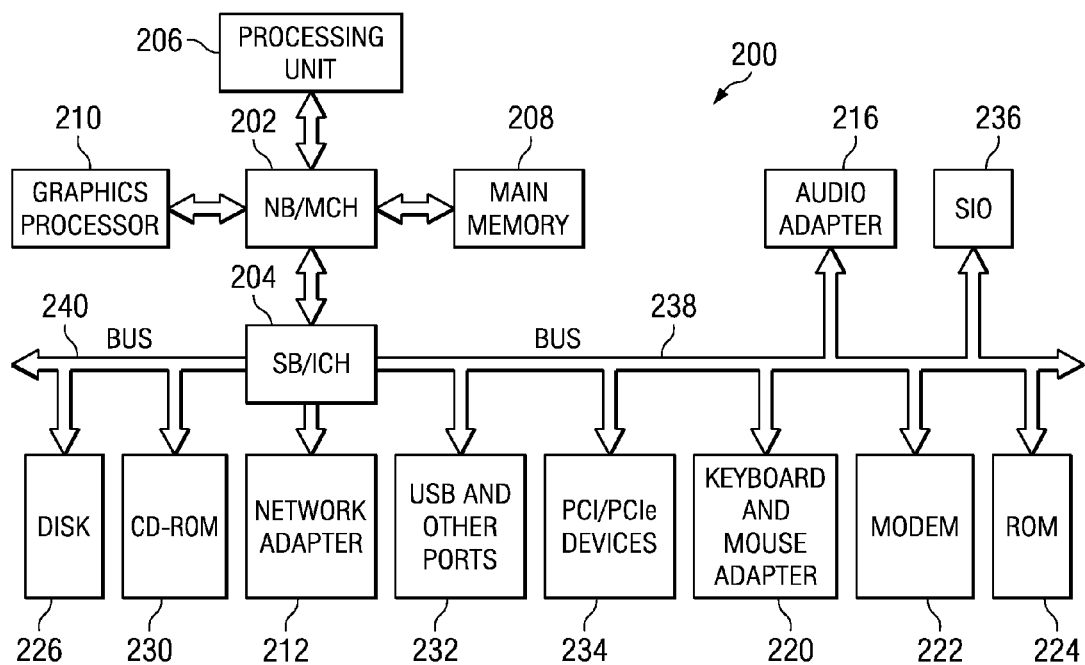
FIG. 2 depicts a block diagram of a data processing system in which illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

With reference now to the figures, FIG. 1 depicts a pictorial representation of a network of data processing systems in which illustrative embodiments may be implemented. Network data processing system 100 is a network of computers in which embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. These clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for different embodiments.

With reference now to FIG. 2, a block diagram of a data processing system is shown in which illustrative embodiments may be implemented. Data processing system 200 is an example of a computer, such as server 104 or client 110 in FIG. 1, in which computer usable code or instructions implementing the processes may be located for the illustrative embodiments.

In the depicted example, data processing system 200 employs a hub architecture including a north bridge and memory controller hub (MCH) 202 and a south bridge and input/output (I/O) controller hub (ICH) 204. Processing unit 206, main memory 208, and graphics processor 210 are coupled to north bridge and memory controller hub 202. Processing unit 206 may contain one or more processors and even may be implemented using one or more heterogeneous processor systems. Graphics processor 210 may be coupled to the MCH through an accelerated graphics port (AGP), for example.

In the depicted example, local area network (LAN) adapter 212 is coupled to south bridge and I/O controller hub 204 and audio adapter 216, keyboard and mouse adapter 220, modem 222, read only memory (ROM) 224, universal serial bus (USB) ports and other communications ports 232, and PCI/PCIe devices 234 are coupled to south bridge and I/O controller hub 204 through bus 238, and hard disk drive (HDD) 226 and CD-ROM drive 230 are coupled to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM drive 230 may use, for example, an integrated drive electronics (IDE) or serial advanced technology attachment (SATA) interface. A super I/O (SIO) device 236 may be coupled to south bridge and I/O controller hub 204.

An operating system runs on processing unit 206 and coordinates and provides control of various components within data processing system 200 in FIG. 2. The operating system may be a commercially available operating system such as Microsoft® Windows® XP (Microsoft and Windows are trademarks of Microsoft Corporation in the United States, other countries, or both). An object oriented programming system, such as the Java™ programming system, may run in conjunction with the operating system and provides calls to the operating system from Java programs or applications executing on data processing system 200. Java and all Java-based trademarks are trademarks of Sun Microsystems, Inc. in the United States, other countries, or both.

Instructions for the operating system, the object-oriented programming system, and applications or programs are located on storage devices, such as hard disk drive 226, and may be loaded into main memory 208 for execution by processing unit 206. The processes of the illustrative embodiments may be performed by processing unit 206 using computer implemented instructions, which may be located in a memory such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may be comprised of one or more buses, such as a system bus, an I/O bus and a PCI bus. Of course the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, main memory 208 or a cache such as found in north bridge and memory controller hub 202. A processing unit may include one or more processors or CPUs. The depicted examples in FIGS. 1-2 and above-described examples are not meant to imply architectural limitations. For example, data processing system 200 also may be a tablet computer, laptop computer, or telephone device in addition to taking the form of a PDA.

A company's critical information is typically stored in files in the company's data processing system. A company may deploy file protection software, such as International Business Machines (IBM) IBM® Tivoli® Continuous Data Protection™, to continuously backup the company's critical files. File protection software is also known as file backup software.

A subset of all users of a data processing system, such as, for example, all users working on critical files, is identified. File protection software is installed on the computer of each user in the identified subset. Each user designates which files are considered critical, that is, important. The file protection software on each user's computer monitors the critical files on that computer. Immediately after a critical file has been modified, the file protection software makes a backup copy of the most recently modified file in real-time and assigns it a version number. The file protection software does this without the computer user having to do anything. The file protection software may keep multiple versions of a file, such as, for example, a version for each modification. Depending on the configuration, the file protection software may store, up to twenty versions on the user's local storage device, such as a hard drive on a desktop or laptop computer.

If the computer is connected to a network, the file protection software may also copy the versioned file backup to one or more additional storage devices, such as a device on a storage area network (SAN), or a storage manager server, such as IBM Tivoli Storage Manager™ (TSM) server. If the computer is not currently connected to a network, then the file protection software may wait until the next time the computer is connected to the network, and then copy the versioned file backup to additional storage devices.

The file protection software may also perform traditional backups and make backup copies of non-critical files on a periodic basis, such as, for example, once a day. Some advantages of using file protection software include providing transparent, real-time file backup, backing up files for users who are not connected to the computer because they are working from home or traveling, and providing backup when network connections are intermittent. However, continuously backing up files does not assist in determining whether the user was authorized to modify a particular file.

Therefore, it would be advantageous to be able to define one or more modification policies that contain information on who can access a file or when a file can be accessed, and associate a modification policy with each file that is created. If a file is subsequently modified in violation of the file's associated modification policy, an alert is generated. The alert may be sent to a software component, such as the operating system or another software application, or the alert may be sent to one or more users, such as a security administrator or the owner of the file.

Each file has associated metadata, such as the user who last modified the file, and the date the file was last modified. Typically, the file protection software continuously performs a backup of a file each time the file is modified. Because the file protection software makes a backup of the file each time the file is modified, the file protection software can quickly and easily examine the metadata associated with the file to determine whether a modification policy has been violated.

Typically, the file protection software creates a copy of a file each time the file is modified and stores the file with a unique version number. Thus, after a file has been modified, the file protection software can (i) examine the file's associated modification policy, and (ii) examine the file's associated metadata in order to determine if the modification policy has been violated.

For example, suppose the modification policy contains a list of users authorized to access the file, and an unauthorized user modifies the file. When the file protection software, immediately after the modification, creates a backup copy of the modified file, the file protection software can examine the file's modification policy and metadata, and determine that the last user to modify the file was not authorized to do so. The file protection software can then send an alert to another software component, or an appropriate user.

Similarly, suppose the modification policy contains a length of time, such as one year, and a user modifies the file more than one year after the previous modification. When the file protection software creates a backup of the modified file, the file protection software can examine the file's metadata and associated modification policy and determine that the most recent modification to the file occurred more than a year after the previous modification. The file protection software can then send an alert.

The alert may, for example, be a message to another software component, or to a user. The alert may take the form of an email, instant message, page, automated voice message or other notification mechanism. The modification policy may specify a specific software component or user to alert. If the modification policy does not specify where the alert should be sent, the file protection software may send an alert to a default software component, such as the operating system, or a default user, such as the owner of the file. The file protection software may also take a specific action, such as locking out the user who made the modification and prevent that user from modifying any other files.

With reference now to FIG. 3, a diagram of a data processing network with file protection software is depicted in which different embodiments may be implemented. Data processing network with file protection software 300, may have a network 302 made up of wired or wireless components. The wired components may, for example, use some form of Ethernet, such as 10/100 or Gigabit Ethernet. The wireless components may, for example, use Bluetooth or some variation of 802.11.

Connected to the network are various computers and servers, such as local server 304, remote server 306, desktop 308, and laptop 310. Local server 304 may be located geographically close to desktop 308, while remote server 306 may be located geographically distant from desktop 308.

A computer, such as laptop 310, may intermittently connect to network 302. For example, laptop 310 may be used by an employee at home, or while the employee is traveling, so that connectivity to network 302 may not be possible all the time. In such situations, laptop 310 may connect to network 302 only when connectivity is available, such as when the user is in a hotel that offers network access.

File protection software (FPS) is a collection of one or more software components that are deployed on each computer where file protection is desired. The file protection software works in conjunction with a computer's operating system to transparently backup critical files each time those files are modified on that computer.

If a user is working on or potentially may work on, critical files, then file protection software is typically deployed on that user's computer. File protection software may be deployed on a desktop or a laptop computer, that is, file protection software may be deployed on a computer which is permanently connected to the network, or a computer which is intermittently connected to the network. In this example, file protection software 312 and 314 are deployed on laptop 310 and desktop 308, respectively.

Desktop 308 may have one or more disk drives, such as drive 316. Typically, drive 316 is divided so that there is an area for the user to store files, such as desktop files 318, and an area for file protection software 314 to store backup files, such as backup area 320. File protection software 314 monitors the files designated as critical within desktop files 318. When a critical file is modified, file protection software 314 makes a backup of the file and stores the backup in backup area 320, and typically, also on local server 304, and remote server 306. The file protection software can make backup copies almost immediately on local server 304, and remote server 306, because desktop 308 has a permanent network connection to network 302.

Drive 322 is a disk drive on laptop 310. Drive 322 contains laptop files 324 and backup area 326, similar to drive 316. When a critical file from laptop files 324 is modified, file protection software 312 makes a backup copy of the modified file in backup area 326. Because laptop 310 is intermittently connected to network 302, file protection software 312 may not always be able to store a backup copy of the modified file on to local server 304 or remote server 306.

In addition to constantly monitoring critical files and transparently making backup copies when critical files are modified, file protection software 312 also constantly monitors the network connectivity of the computer it is installed on, such as laptop 310. Thus, file protection software 312 is aware of when laptop 310 is connected to network 302 and when laptop 310 is not connected to network 302.

If laptop 310 is connected to network 302, the operation of file protection software 312 proceeds similar to the previously described operation of file protection software 314. However, if laptop 310 is not connected to network 302, then file protection software 312 makes a backup copy of a modified critical file and stores the backup copy in backup area 326. If laptop 310 subsequently connects to network 302, then file protection software 312 may make a backup copy of the modified critical file on local server 304, on remote server 306, or both.

With reference now to FIG. 4, a block diagram depicting file protection software on a data processing network is depicted in which different embodiments may be implemented. File protection software on a data processing network 400 has various network components, of which only the relevant components are shown here. Network 402 has attached to it desktop 404, local storage 406, and remote storage 408.

File protection software (FPS) 410 is installed on desktop 404. Desktop 404 has one or more storage devices, such as drive 412, attached to it. Drive 412 contains various files, including user files 414, which is a collection of files that the user of desktop 404 is working on. Drive 412 also includes backup area 416, which file protection software 410 uses to store backup copies on.

File protection software 410 constantly monitors user files 414, and when a user modifies a file from user files 414, such as critical file 418, file protection software 410 makes a backup copy of critical file 418 to backup area 416. File protection software 410 may also make an additional backup copy of critical file 418 to local storage 406, or remote storage 408, or both.

Critical file 418 has various parts, including contents 420 and metadata 422. Critical file 418 also has an associated modification policy 424. After file protection software 410 has made one or more backup copies of critical file 418, file protection software 410 examines the modification policy 424 and metadata 422 of critical file 418. Metadata 422 has various fields, including user 426 and date modified 428.

File protection software 410 determines, based on modification policy 424 and metadata 422, whether the most recent modification to critical file 418 violated modification policy

424. If file protection software 410 determines modification policy 424 was not violated, file protection software 410 does not take any action. However, if file protection software 410 determines modification policy 424 was violated, file protection software 410 generates alert 430.

Alert 430 may be any type of computer-cognizable or human-cognizable communication, such as one or more of an email, Simple Network Management Protocol (SNMP) message, pager, instant message, or voice mail alert. If modification policy 424 specifies a delta file, containing the difference between the current file and the previous version, then file protection software 410 creates the delta file and attaches the delta file to the alert message.

If modification policy 424 specifies a user or software component to send the alert to, then file protection software 410 sends alert 430 to the specified user or software component. If modification policy 424 does not specify where to send alert 430, then file protection software 410 sends the alert to a default entity. The default entity may be the owner of the file, a system administrator, or another software component.

Of course, a network typically has other components as well, besides those shown in FIG. 4. For example, the network architecture or topology may be different; there may be many more users, with additional software applications running on each computer and so on. However, other components of the network are not shown for the sake of clarity.

Figure 5:
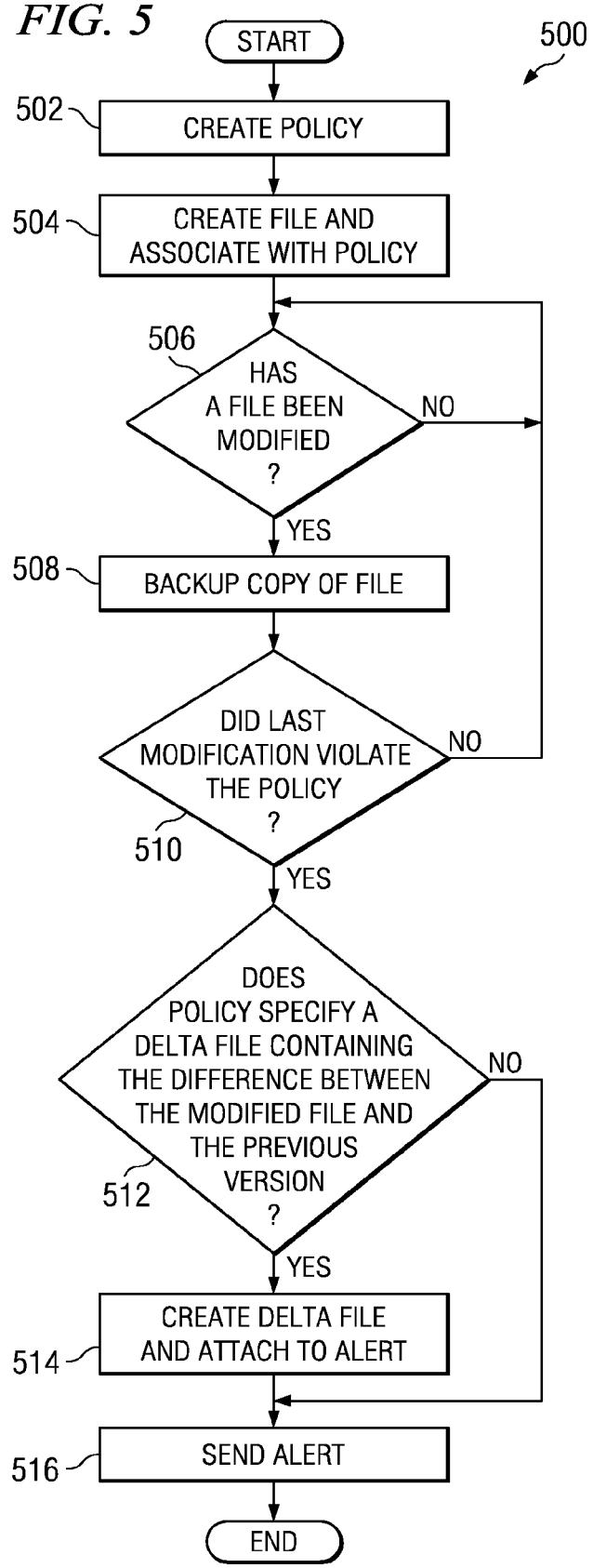
FIG. 5 depicts a flow diagram of generating an alert when a policy violation is discovered, as depicted in accordance with an illustrative embodiment.

FIG. 5 illustrates a flowchart of a process for generating an alert when a policy violation is discovered, as depicted in accordance with an illustrative embodiment. The process in FIG. 5 may be implemented in a software component, such as file protection software 312 or file protection software 314 in FIG. 3.

Operation starts when a policy is created (step 502). The policy specifies how users can interact with the file, such as which user or users are authorized to modify the file. A file is created and associated with the policy (step 504). A system administrator may create numerous policies and as users create files, each user can associate the user's file with a pre-existing policy. Alternately, a user may create a specific policy tailored for the user's application and then create and associate a file with that policy.

The steps that follow are all taken by file protection software, such as file protection software 312 or file protection software 314 in FIG. 3. The file protection software checks to see if a file has been modified (step 506). If the file has not been modified, the file protection software continues to monitor the file's usage and waits for the file to be modified. If the file has been modified, the file protection software creates a backup copy of the file (step 508).

Those versed in the art will appreciate that the file protection software may backup the copy of the file in any number of ways, based on the configuration of the file protection software. For example, the file protection software can make three copies of the file, storing a first copy on the same drive as the original, a second copy on a local server, and a third copy on a remote server. Furthermore, the copies of the file might have version numbers so that a new version of the file is stored each time the file is modified.

The file protection software checks to see whether the last modification to the file resulted in a violation of the policy associated with the file (step 510). If the last modification to the file did not result in a violation of the policy, then the file protection software goes back and waits for a file to be modified (step 506).

If the last modification to the file resulted in a violation of the policy, then the file protection software checks the policy to see if the policy specifies that a delta file be created for inclusion in the alert (step 512). The delta file contains the difference between the modified file and the previous version of that file. If the policy specifies a delta file, then the file protection software creates a delta file (step 514), and attaches the delta file to an alert. The file protection software then sends the alert (step 516) and the operation ends. If the policy does not specify a delta file, then the file protection software sends an alert (step 516) and the operation ends.

The above operation may be applied to alert a software component or user when a policy violation has occurred. For example, if the policy contains information about which user or users are authorized to modify a particular file, then the policy is violated if a user not mentioned as authorized in the policy modifies the file. In this way, any time an unauthorized user modifies a file, the file protection software may send an alert.

Similarly, the policy may specify a time period, such as one year. If a user modifies a file on date XXXX, and the file was previously modified on date YYYY, then the policy is violated if XXXX minus YYYY is greater than the time period specified in the policy. In this way, if a file that has not been modified in many months is suddenly modified, an appropriate user can be notified.

Therefore, it is advantageous to use file protection software, as described above, to generate an alert when a file modification policy is violated. Typically, a user, such as a system administrator, creates a file modification policy. Users who work or may work on critical files are identified, and file protection software (FPS) is deployed on each user's computer, such as a desktop, or laptop computer.

When a user working on a computer with file protection software installed creates a file, the user may designate the file to be critical and associate the file with the file modification policy. The file protection software monitors all critical files, which may be all the files on a computer, or a subset of those files. When a critical file is modified, the file protection software (i) makes a backup copy, and (ii) determines whether the file modification policy has been violated. Upon determining that the file modification policy has been violated, the file protection software sends an alert, indicating that a violation of the policy has occurred. Those versed in the art will appreciate that the alert may be sent to a user, or another software component.

The alert may, for example, be sent to the operating system so that the operating system can lock out one or more users. Or, the alert may consist of creating a log that then notifies interested parties such as the owner of the file or the system administrator.

One advantage of using file protection software to check for a file policy violation and generate an alert is that additional software to monitor files for modification and policy violation is not required. The file protection software already makes a copy of each critical file almost immediately after the file has been modified, and so the file protection software already monitors files and knows when a file has been modified.

Because the file protection software has access to metadata about the modified file, such as who modified the file last and when the last modification took place, the file protection software can quickly and easily determine whether the last modification violated a specific file modification policy. For example, the file protection software can determine whether the user to last modify the file was not authorized to do so, or if the most recent modification occurred more than a specified time period after the previous modification.

Another advantage of using the file protection software to send an alert when a file modification violates a policy is that the alerted user or software component can use the file protection software to see the modifications made to the file. Because the file protection software makes multiple backup copies of the file, with each new modification resulting in a new backup version, an alerted user or software component can use the file protection software to view a version of the file that does not contain the most recent modifications.

Another advantage is that the file protection software can compare the most recently modified file with the previous version and, in the alert sent to the user, include a delta of the two files showing only the most recent modifications. Thus a user could receive an alert showing all of the most recent modifications and quickly decide whether or not to keep the most recent modifications Yet another advantage is that a user alerted to modifications that the user does not want, can use the file protection software to restore a version of the file without the most recent modifications. Because the file protection software is designed to backup and restore one of the multiple backup versions of a file, an alerted user can quickly restore a specific, previous version of the file. The file's policy could also specify that no further modifications are allowed and in the event that a user breaches security and modifies the file, the file protection software would automatically restore the authorized version of the file, and store a copy of the unauthorized modification of the file in case a system administrator wants to examine the file.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for generating an alert using file backup software, the computer implemented method comprising:

monitoring a plurality of files for modifications using the file backup software;

responsive to the file backup software detecting a modification of a file in the plurality of files, determining by the file backup software whether a modification policy associated with the file has been violated by the modification; and responsive to determining by the file backup software that the modification policy has been violated, the file backup software performing steps comprising:

generating an alert and a delta file, wherein the alert indicates that a modification violating the modification policy has occurred, wherein the modified file is compared to a previous version of the file to create the delta file, and the delta file is attached to the alert;

storing the delta file including the modification violating the modification policy, wherein the file backup software is used to view the modification violating the modification policy; and automatically restoring the previous version of the file.

2. The method of claim 1, wherein the alert comprises at least one of a log file, a simple network management protocol (SNMP) message, an email, a voice mail, an instant message, a text message, or a pager message, and generating the alert comprises sending the alert to the user or a software component.

3. The method of claim 1, wherein the modification policy specifies one or more users with permission to access the file, and the modification policy is violated if the file is modified by a user different than the one or more users.

4. The method of claim 1, wherein the modification policy specifies a time period, the file is modified at a first date and at a second date, and the modification policy is violated if the difference between the second date and the first date exceeds the time period.

5. The method of claim 1, further comprising, responsive to determining by the file backup software that the modification policy is violated, the file backup software further performing steps comprising:

sending the alert to the operating system to trigger the operating system to lock out one or more users that violated the modification policy; and preventing the one or more users from modifying any other files.

6. A data processing system for generating an alert when a modification policy is violated, the data processing system comprising:

a bus;
a storage device connected to the bus;
a communications unit connected to the bus;
a processing unit connected to the bus; and
file backup software that monitors a plurality of files on the storage device, wherein a first user creates a modification policy, the first user creates a file associated with the modification policy, a second user modifies the file to form a modified file, the file backup software detects the modified file, the file backup software determines whether the modified file violates the modification policy, and responsive to determining by the file backup software that the modified file violates the modification policy, the file backup software:
  generates an alert and a delta file, wherein the modified file is compared to a previous version of the file to create the delta file, and the delta file is attached to the alert;
  stores the delta file including a modification violating the modification policy, wherein the file backup software is used to view the modification violating the modification policy; and
  automatically restores the previous version of the file.

7. The data processing system of claim 6, wherein the alert comprises at least one of a log file, a simple network management protocol (SNMP) message, an email, a voice mail, an instant message, a text message, or a pager message.

8. The data processing system of claim 6, wherein the modification policy specifies one or more users with permission to access the file, and the second user is different than the one or more users.

9. The data processing system of claim 6 wherein the modification policy specifies a time period, the file is modified at a first date and at a second date, and the modification policy is violated if the difference between the second date and the first date exceeds the time period.

10. The data processing system of claim 6, further comprising, responsive to determining by the file backup software that the modification policy is violated, the file backup software:
  sends the alert to the operating system to trigger the operating system to lock out one or more users that violated the modification policy; and
  prevents the second user from modifying any files.

* * * * *